United States Patent
Li

(10) Patent No.: US 12,481,092 B2
(45) Date of Patent: Nov. 25, 2025

(54) LIGHT FILTER AND THE METHOD THEREOF

(71) Applicant: INNOWORKS PRODUCT CREATION LIMITED, Hong Kong (CN)

(72) Inventor: Wai Yan Vian Li, Hong Kong (CN)

(73) Assignee: INNOWORKS PRODUCT CREATION LIMITED, Hong Kong (CN)

( * ) Notice: Subject to any disclaimer, the term of this patent is extended or adjusted under 35 U.S.C. 154(b) by 457 days.

(21) Appl. No.: 17/755,829

(22) PCT Filed: Nov. 25, 2019

(86) PCT No.: PCT/CN2019/120583
§ 371 (c)(1),
(2) Date: May 10, 2022

(87) PCT Pub. No.: WO2021/102628
PCT Pub. Date: Jun. 3, 2021

(65) Prior Publication Data
US 2022/0404532 A1    Dec. 22, 2022

(51) Int. Cl.
*G02B 5/02*     (2006.01)
*A61N 5/06*     (2006.01)

(52) U.S. Cl.
CPC .............. *G02B 5/0294* (2013.01); *A61N 5/06* (2013.01); *G02B 5/0242* (2013.01); *A61N 2005/0631* (2013.01)

(58) Field of Classification Search
CPC .. G02B 5/0294; G02B 5/0242; G02B 5/0278; G02B 5/206; G02B 5/3008; A61N 5/06; A61N 2005/0631
See application file for complete search history.

(56) References Cited

U.S. PATENT DOCUMENTS

| 6,144,491 A * | 11/2000 | Orikasa ................. G03B 21/60 359/452 |
| 2003/0164906 A1 | 9/2003 | Arakawa et al. |
| 2004/0032546 A1* | 2/2004 | Ito ......................... G02F 1/1335 349/96 |
| 2008/0186582 A1* | 8/2008 | Matsuura .......... G02F 1/133502 359/601 |
| 2010/0284170 A1* | 11/2010 | Awaji ................... G02B 5/0268 156/229 |
| 2017/0153377 A1 | 6/2017 | Song et al. |

FOREIGN PATENT DOCUMENTS

| CN | 102945919 A | 2/2013 |
| CN | 102955184 A | 3/2013 |
| CN | 102945919 B | 4/2015 |
| CN | 204364690 U | 6/2015 |

(Continued)

*Primary Examiner* — Angela M. Medich
(74) *Attorney, Agent, or Firm* — EAGLE IP LIMITED

(57) ABSTRACT

A light filter (100) includes at least one layer of binder matrix (110) and a multitude of transparent crystals (120). The multitude of transparent crystals (120) are irregularly and laterally dispersed in the at least one layer of binder matrix (110), such that light passing through the light filter (100) is separated into different wavelengths and polarized into different orientations.

4 Claims, 7 Drawing Sheets

(56) References Cited

FOREIGN PATENT DOCUMENTS

| | | | |
|---|---|---|---|
| CN | 106133558 | A | 11/2016 |
| CN | 106328795 | A | 1/2017 |
| CN | 106333417 | A | 1/2017 |
| JP | S6072567 | A | 4/1985 |
| JP | H09297204 | A | 11/1997 |
| JP | 2002258039 | A | 9/2002 |
| JP | 2002320683 | A | 11/2002 |
| JP | 2004329473 | A | 11/2004 |
| JP | 2004341446 | A | 12/2004 |
| JP | 2006261382 | A | 9/2006 |
| JP | 2008091140 | A | 4/2008 |
| JP | 2008188258 | A | 8/2008 |
| JP | 2010033861 | A | 2/2010 |
| JP | 2010212184 | A | 9/2010 |
| JP | 2015195387 | A | 11/2015 |
| JP | 2017071696 | A | 4/2017 |
| KR | 100344880 | B1 | 1/2003 |
| WO | 9936478 | A1 | 7/1999 |
| WO | 2006006663 | A1 | 1/2006 |
| WO | 2011022525 | A1 | 2/2011 |
| WO | 2011033329 | A1 | 3/2011 |
| WO | 2012054318 | A1 | 4/2012 |
| WO | 2012011591 | A1 | 9/2013 |
| WO | 2015151092 | A1 | 10/2015 |
| WO | 2019026854 | A1 | 2/2019 |
| WO | 2019138751 | A1 | 7/2019 |

\* cited by examiner

US 12,481,092 B2

LIGHT FILTER AND THE METHOD THEREOF

FIELD OF INVENTION

This invention relates to a polarizing light filter, a polarized light and method of using the filter.

BACKGROUND OF INVENTION

The use of visible spectrum of electromagnetic radiation, i.e. colored light to cure diseases and heal wounds is known as light therapy. Visible light can be broken down into numerous electromagnetic frequencies, and frequency relates to different colors, i.e. red, orange, yellow, green, blue, indigo, violet and all the vibrations thereof. Each color is characteristic of a distinct wavelength, frequency and quantity of energy. According to the teachings of light therapy, these visual colors with their unique wavelengths and oscillations provide the necessary healing energy required by the body when they are selectively applied to impaired organs or life systems. Different light wavelengths penetrate the skin at different depths, generating electrical impulses and fields of energy that are prime activators of the biochemical and hormonal processes in the human body.

Among different types of light therapies, Polarized Light Therapy (PLT) utilizes polarized light radiation to treat diseases or injuries. When light is polarized, it causes the individual light particles to vibrate and travel in same direction, allowing for deeper penetration into the body.

SUMMARY OF INVENTION

In the light of the foregoing background, it is an object of the present invention to provide an improved device and method for light therapy.

Accordingly, the present disclosure teaches a device and method for light therapy with better bio-stimulatory effects.

An exemplary embodiment of the present invention is a light filter that includes at least one layer of binder matrix and a multitude of transparent crystals. The multitude of transparent crystals are irregularly and laterally dispersed in the at least one layer of binder matrix, such that light passing through the light filter is separated into different wavelengths and/or polarized into different orientations.

Another example embodiment is a lighting device that includes a light source adapted to illuminate in at least one direction and at least one light filter that is disposed in the at least one illumination direction of the light source. The light filter includes at least one layer of binder matrix and a multitude of transparent crystals. The multitude of transparent crystals are irregularly and laterally dispersed in the at least one binder matrix, such that light passing through the light filter is separated into different wavelengths and/or polarized into different orientations.

Another example embodiment is a method of treating an acute or chronic pain in a subject in need thereof, includes shining light towards the subject using a lighting device, separating the light into different wavelengths and/or polarizing the light into different orientations using a light filter, and shining the light of different wavelengths and/or orientations onto the subject.

Another example embodiment is a method of improving blood circulation in a subject in need thereof, includes shining light towards the subject using a lighting device, separating the light into different wavelengths and/or polarizing the light into different orientations using a light filter, and shining the light of different wavelengths and/or orientations onto the subject.

Other example embodiments are discussed herein.

DETAILED DESCRIPTION

As used herein and in the claims, "comprising" means including the following elements but not excluding others.

As used herein and in the claims, "various shapes" includes but not limited to sphere, cube, cuboid, cylinder, cone, triangular prism, pentagonal prism, hexagonal prism, square-based pyramid, tetrahedron, octahedron, powder, and other polygonal or irregular shapes.

As used herein and in the claims, "irregularly" means in a way or pattern that is not according to a formal arrangement, but may be random in nature.

As used herein and in the claims, "laterally" means in a direction towards the side.

As used herein and in the claims, "transparent" means at least partially optically clear and having the property of allowing certain amount of light rays transmitting through its substance. The amount of light rays that is transmissible can be determined according to the user's application.

As used herein and in the claims, "crystals" refers to solid materials including but not limited to glass, crystals and plastic.

As used herein and in the claims, "light" refers to all forms of electromagnetic radiation, including radio waves, microwaves, infrared waves, visible light, ultraviolet radiation, X-rays, and gamma rays.

As used herein and in the claims, "highly scattered" refers to an average intensity of scattered light of not less than 0.001 cd.

Example embodiments provides a solution to produce a light that is highly scattered and/or refracted, including multiple internal reflections and multiple polarization and is separated into different wavelengths and polarized into different orientations for light therapy.

Light filters according to example embodiment are used to convert a light emitted from a light source into different wavelengths and different orientations to enable improvement of existing treatment effects by stimulating and accelerating healing and promoting recovery.

In the following description, same numberings are employed to illustrate the same components in different figures.

Figure 1A:
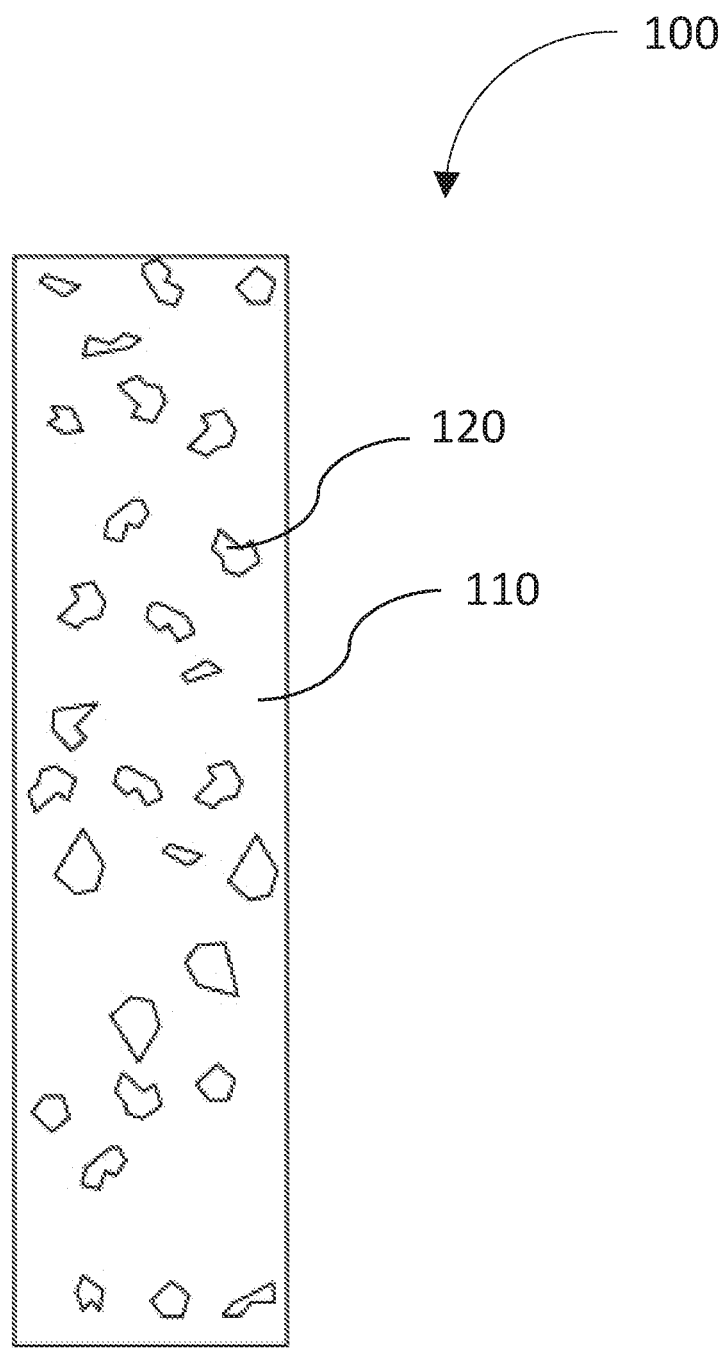
FIG. 1A and FIG. 1B show cross sectional views of a light filter in accordance with example embodiments.

Referring now to FIG. 1, a light filter 100 comprising a layer of binder matrix 110 and a multitude of transparent crystals 120 is shown. The scores of transparent crystals 120 are randomly, irregularly and laterally dispersed in the layer of binder matrix 110. The layer of binder matrix 110 holds the transparent crystals 120 together to maintain the relative position of the multitude of transparent crystals 120 within the binder matrix 110. In some example embodiments, the transparent crystals 120 are randomly distributed within the layer of binder matrix 110.

Figure 1B:
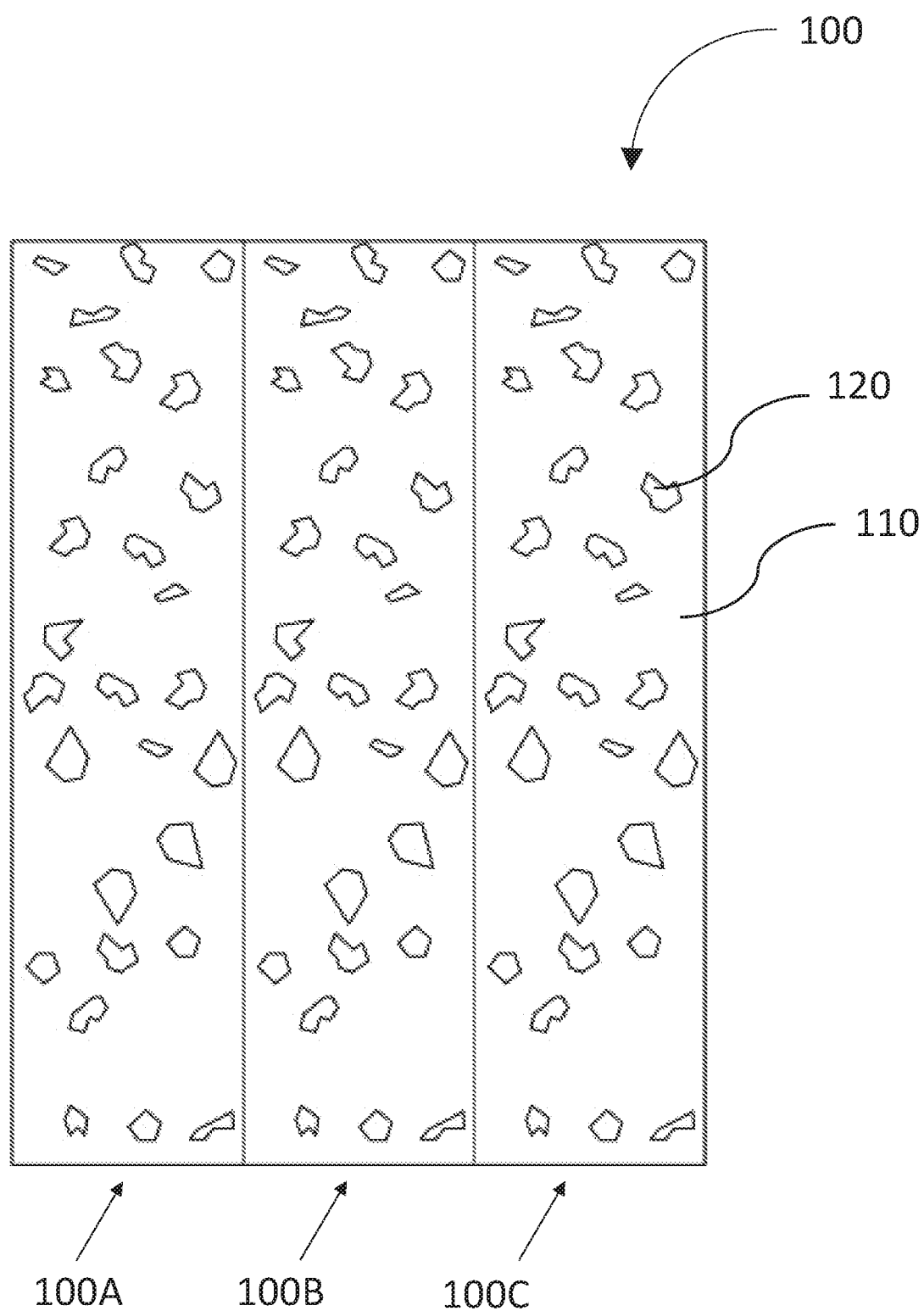

In some example embodiments, the light filter 100 may include more than one layer of binder matrix 110 with transparent crystals 120 dispersed therein. Referring to FIG. 1B, for example, the light filter 100 includes three layers of binder matrix 110, namely 100A, 100B and 100C adhered together. In some other example embodiments, some of the layers of binder matrix 110 may not contain crystals 120 dispersed therein. In yet another example embodiment, the light filter 100 may include at least one layer of glass adhered to the at least one layer of binder matrix 110.

In some example embodiments, the binder matrix 110 is made of a transparent polymer with a high degree of transparency to allow for high light transmission and optical clarity. In a further example embodiment, the transparent polymer is selected from the group consisting of polycarbonate, polymethyl methacrylate (PMMA), polyethylene terephthalate, polyethylene terephthalate-1,4-cyclohexane 2 methyl ester (PETG), polyvinyl chloride (PVC), liquid silicone rubber, cyclic olefin copolymers, polyethylene, polystyrene, methyl methacrylate-acrylonitrile-butadiene-styrene (MABS), ionomer resin, polypropylene, fluorinated ethylene propylene (FEP), styrene methyl methacrylate (SMMA), styrene acrylonitrile (SAN), epoxy or a combination thereof In some example embodiments, the transparent crystals 120 are made of glass, crystals or plastic to allow a high degree of light transmission. In a further example embodiment, the transparent crystals 120 are made of silicon dioxide. In some example embodiments, the transparent crystals 120 may have various shapes as shown in FIG. 1. The various shapes include but are not limited to sphere, cube, cuboid, cylinder, cone, triangular prism, pentagonal prism, hexagonal prism, square-based pyramid, tetrahedron, octahedron, powder, and other polygonal or irregular shapes, or any combination thereof. In some example embodiments the transparent crystals 120 may have various sizes. In a further example embodiment, the transparent crystals 120 have a particle size between 0.01 mm to 5 mm. At such fine particle sizes, the transparent crystals can be in a sand-like or powder form. The smaller the particle size of the transparent crystals, the greater the scattering of light.

In one example embodiment, the light filter 100 has a thickness of 0.01 mm to 20 mm. In a further example embodiment, the light filter 100 has a thickness of 0.1 mm to 2 mm. The thickness of the light filter 100 affects the dispersion angle of light passing through the light filter. The thicker the light filter, the lesser the dispersion angle of the light, resulting in a more focused light ray. The selection of the thickness of the filter can be selected according to the users' requirements.

Figure 2A:
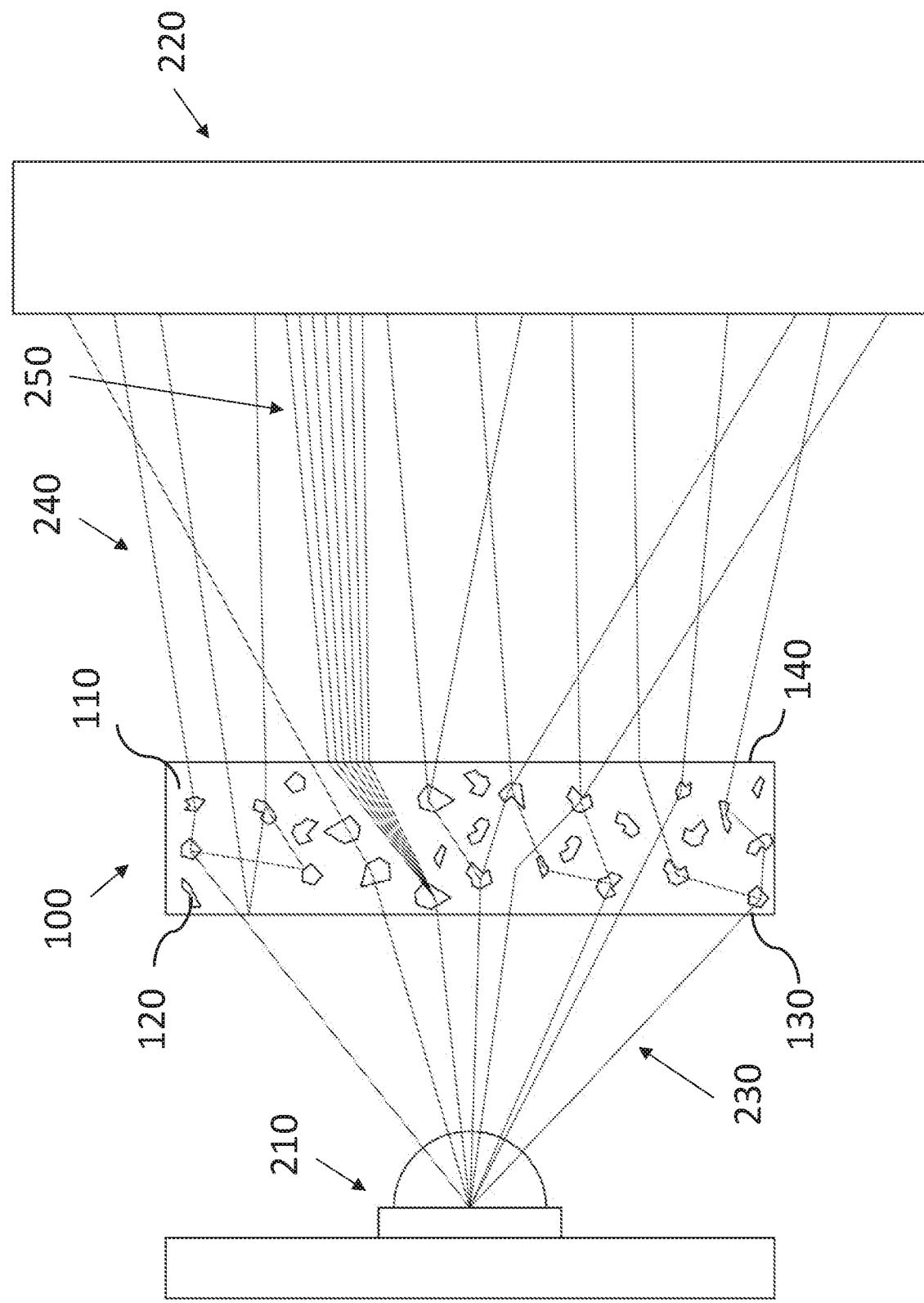
FIGS. 2A and 2B show schematic views of light paths of a bundle of light rays passing through a light filter in accordance with an example embodiment.

Referring now to FIG. 2A, light paths of a bundle of light rays passing through the light filter 100 is shown. The light source may be, for example, a fluorescent light, a light emitting diode (LED) light, an incandescent light, a LASER light, a UV light, an infrared emission by heating, or an infrared LED light. The light filter 100 is placed between a light source 210 and an object 220. The light filter 100 comprises a first surface 130 facing the light source 210 and a second surface 140 opposite to the first surface facing the object 220. Light rays generated by the light source 210 enter the first surface 130 of the light filter 100, pass through the light filter 100, emerge from the second surface of the light filter 100 and reach the object 220. In this example embodiment as shown in FIG. 2A, a bundle of incident light rays 230 emitted from the light source 210 enters the first surface 130 of the light filter 100. When the light rays 230 travels through the binder matrix 110, some of the light rays will pass through the multitude of transparent crystals 120 randomly dispersed in the binder matrix 110. The transparent crystals 120 may have various shapes and sizes. Upon passage through transparent crystals 120 that are shaped as prisms, the light ray is separated into different colors with different wavelengths that emerge from the prisms at different angles. The light ray will be further refracted when emerging from the second surface of the light filter 100, resulting in a refracted ray 250 with different wavelengths separated at different angles when the light reaches the object 220. In addition, polarization also occurs by the refraction and/or reflection of light when the light ray passes through the multitude of transparent crystals 120. Refraction occurs when a beam of light passes from one material into another material, for example, from air into binder matrix, from binder matrix into transparent crystals and vice versa. The path of the beam changes its orientation at the surface of the two materials, and the refracted beam acquires some degree of polarization. Since the incident light rays passes through transparent crystals 120 of various shapes and sizes, and sometimes even passes through multiple transparent crystals before transmitting out of the light filter 100, the refracted and/or reflected rays 240 emerging from the light filter are highly scattered and polarized in different orientations.

Figure 2B:
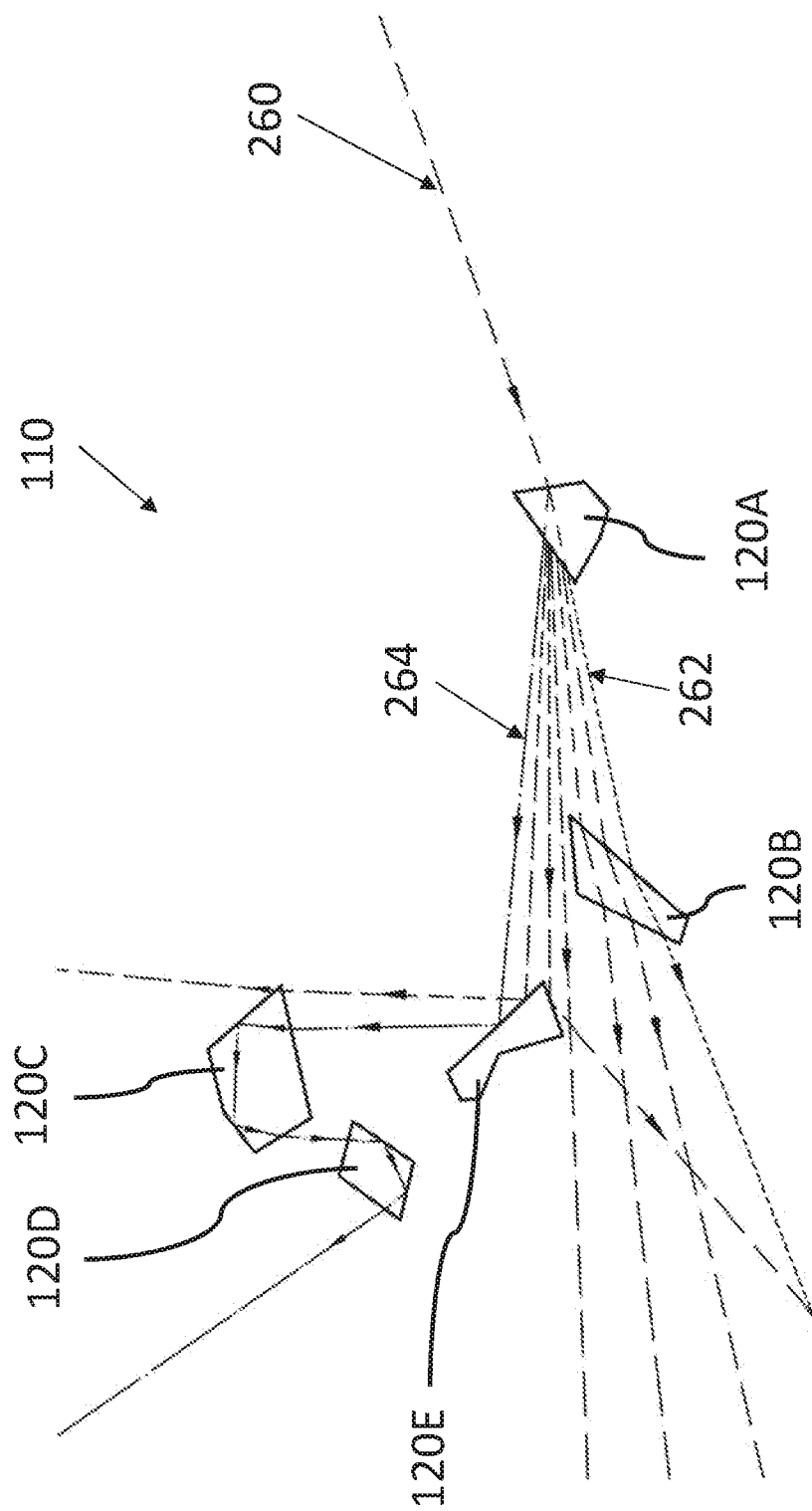

FIG. 2B shows an example of a light ray 260 (shown as dotted line) passing through a plurality of transparent crystals 120A, 120B, 120C, 120D and 120E dispersed randomly within the binder matrix 110 of the light filter. Upon passage through transparent crystal 120A, the light ray 260 is separated into several light rays, for example, light ray 262 and 264 (shown as dotted lines) with different wavelengths that emerge from the transparent crystal 120A at different angles. Light ray 262 passes through transparent crystal 120B and its light path is further refracted when emerging from transparent crystal 120B. Light ray 264 is reflected by the surface of transparent crystal 120E, and the reflected ray enters transparent crystal 120C. Upon entering transparent crystal 120C, light ray 264 may experience multiple internal reflections within transparent crystal 120C before it emerges from the transparent crystal. In some situation as illustrated in FIG. 2B, light ray 264 may even experience another multiple internal reflections when it passes through transparent crystal 120D. In addition, polarization also occurs by the refraction and/or reflection of light when light rays 262 and 264 passes through the plurality of transparent crystals. The light rays emerging from the light filter are therefore highly scattered and/or refracted, including multiple internal reflections and multiple polarization and are separated into different wavelengths and polarized into different orientations.

Figure 3:
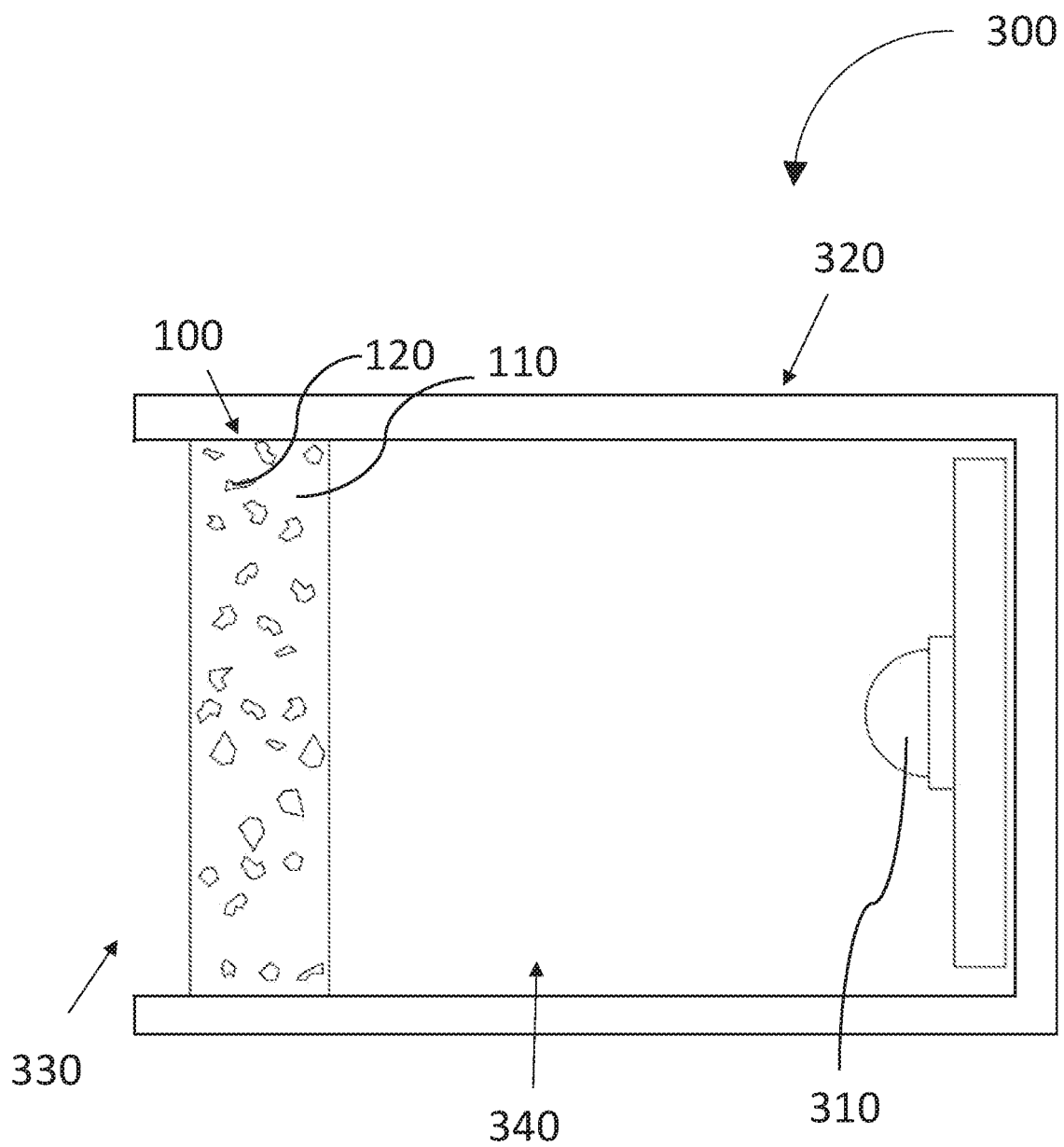
FIG. 3 shows a cross sectional view of a light device in accordance with an example embodiment.

Referring now to FIG. 3, a lighting device 300 comprises a light source 310 adapted to illuminate in a direction, and a light filter 100 disposed in the illumination direction of the light source 310. The light filter 100 comprises a layer of binder matrix 110 and a multitude of transparent crystals 120 irregularly and laterally dispersed in the layer of binder matrix 110. In this example embodiment as shown, the lighting device 300 further comprises a housing 320 and an opening 330 at one end. The light filter 100 is installed in the housing 320 proximal to the opening 330, defining a closed inner space 340 within the housing. The light source 310 is attached to the distal end of the housing 320 opposite to the opening 330. The light source 310 is optically aligned to illuminate in an axis that runs parallel to the length of the housing 320, and the light filter 110 is positioned along the axis. When the light source 310 emits a light ray, the light ray passing through the light filter 110 is highly scattered and/or refracted, including multiple internal reflections and multiple polarization and is separated into different wavelengths and polarized into different orientations.

In some example embodiment, the light source 310 can be a fluorescent light, a LED light, an incandescent light, a LASER light, a UV light, an infrared emission by heating, or an infrared LED light. In some example embodiment, the lighting device further includes a switch to turn on and off the light source 310. In some embodiments, the light source may illuminate from various directions and the filter may be placed in one or more illumination directions of the light source.

Figure 4:
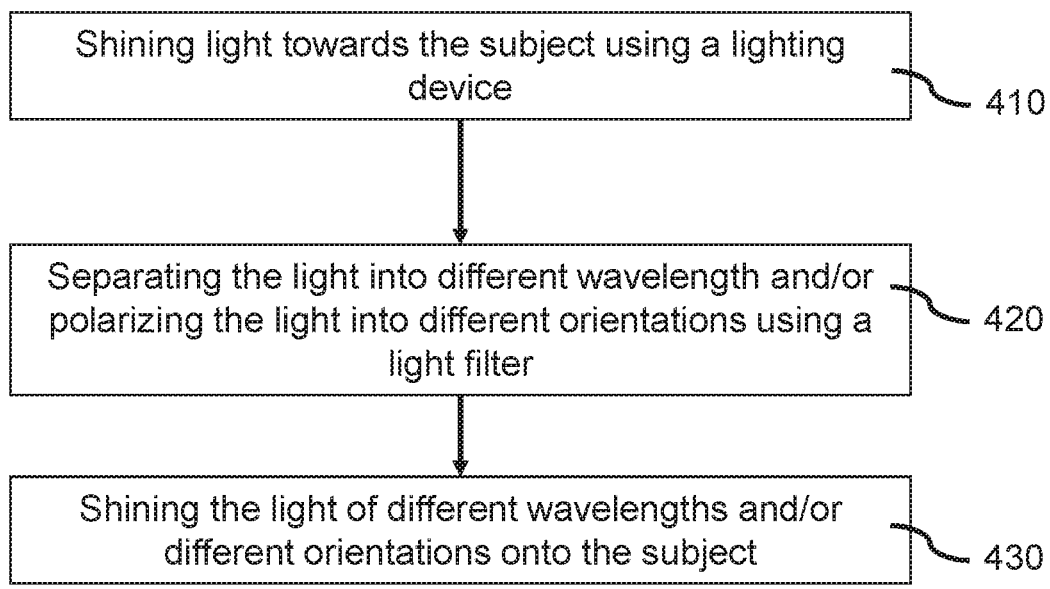
FIG. 4 shows a flow diagram of a method of treating an acute or chronic pain in a subject in accordance with an example embodiment.

FIG. 4 shows a method of treating an acute or chronic pain in a subject in need thereof, including shining light towards the subject using a lighting device (step 410), separating the light into different wavelengths and/or polarizing the light into different orientations using a light filter (step 420) and shining the light of different wavelengths and/or different orientations onto the subject (step 430). In one example embodiment, the lighting device comprises a light source. A light is generated from the light source and shone towards the subject.

As described herein and in the claims, "acute or chronic pain" refers to acute (immediate) or chronic (ongoing) pain in a subject, such as a human or an animal. Acute or chronic pain can occur in a single location or multiple locations in a subject's body. Examples of body locations include, but are not limited to the head, neck, skin, limbs, back, joints and organs. In example embodiments, acute or chronic pain include one or more of the following: toothache, gout, rheumatism pain, pain due to disc herniation, low back pain, joint pain, knee joint pain, chest pain, sciatic pain, pain caused by eczema, limbs paralysis during sleep, wrist pain, cancer-related back pain, neck pain, hemorrhoids pain, trigeminal neuralgia, headache, avascular necrosis pain, cervicobrachial pain, feet pain, arm pain, pelvic pain, lumbar inflammation, plantar fasciitis, calf pain and paralysis, stomachache, knee joint pain, pain due to sequelae of cancer treatment, or a combination of conditions above.

In one example embodiment, the light filter is positioned between the light source and the subject. In a further example embodiment, the light filter is housed inside the lighting device. The light passing through the light filter is highly scattered and/or refracted, including multiple internal reflections and multiple polarization and is separated into different wavelengths and polarized into different orientations.

In one example embodiment, the light emerges from the light filter includes light separated into different wavelengths and polarized into different orientations. The filtered light is shone onto the subject such that the subject receives light therapy of the light of different wavelengths and/or different orientations.

According to the teaching of the present disclosure, it has been determined that light waves hitting parts of the body from different orientations would generate different biological effects.

The following examples are provided in order to demonstrate and further illustrate example embodiments and aspect of the present invention and are not to be construed as limiting the scope thereof.

Example 1: LED Therapy for Pain Alleviation of Acute or Chronic Pain in Subjects The effect of LED therapy on pain alleviation in subjects with acute or chronic pain using a LED light source with the light filter as described above were evaluated.

Subjects with acute or chronic pain were placed under a LED light source with the light filter installed in the illumination direction of the LED light source such that the subjects will receive filtered LED therapy. Irradiation of filtered light was performed 50 minutes per each therapy session for a total of 8 days.

The effectiveness of filtered LED therapy on pain alleviation in subjects suffering from different types of acute or chronic pain are shown in the following Table 1. Among 30 subjects, 97% of the subjects reported a reduction of pain after receiving the filtered LED therapy for a total of not more than 8 days. For some subjects, the degree of pain before and after receiving the filtered LED therapy (on a scale of 1 to 10) are recorded and shown in Table 1.

TABLE 1

| Subject No | Type of Pain | Pain Alleviation (Yes/No) | Degree of pain before treatment (1-10) | Degree of pain after treatment (1-10) |
|---|---|---|---|---|
| 1 | Toothache | Yes | 8.5 | 1.5 |
| 2 | Gout | Yes | | |
| 3 | Rheumatism pain | Yes | | |
| 4 | Pain due to disc herniation | Yes | | |
| 5 | Low back pain and joint pain | Yes | 8.0 | 0 |
| 6 | Knee joint pain | Yes | | |
| 7 | Chest pain | Yes | | |
| 8 | Sciatic pain | Yes | | |
| 9 | Pain caused by eczema | Yes | 10.0 | 0.5 |
| 10 | Hand paralysis during sleep | Yes | | |
| 11 | Wrist pain | Yes | 7.0 | 5.0 |
| 12 | Cancer-related back pain | Yes | 5.0 | 3.5 |
| 13 | Chest pain, joint pain and neck pain | Yes | 5.0 | 0 |
| 14 | Hemorrhoids pain | Yes | 7.0 | 0 |
| 15 | Trigeminal neuralgia | Yes | | |
| 16 | Headache | Yes | | |
| 17 | Avascular necrosis pain | Yes | | |

TABLE 1-continued

| Subject No | Type of Pain | Pain Alleviation (Yes/No) | Degree of pain before treatment (1-10) | Degree of pain after treatment (1-10) |
|---|---|---|---|---|
| 18 | cervicobrachial pain | No | | |
| 19 | Low back pain and feet pain | Yes | | |
| 20 | Arm pain | Yes | | |
| 21 | Body pain, including pelvic pain | Yes | | |
| 22 | Lumbar inflammation and plantar fasciitis | Yes | | |
| 23 | Calf pain and paralysis | Yes | | |
| 24 | Disc herniation | Yes | | |
| 25 | Neck pain & low back pain | Yes | | |
| 26 | Stomachache | Yes | | |
| 27 | Stomachache and feet pain | Yes | | |
| 28 | Knee joint pain | Yes | | |
| 29 | Feet pain | Yes | | |
| 30 | pain due to sequelae of cancer treatment | Yes | | |

Example 2. LED Therapy for Improving Blood Circulation in Subjects

Another example embodiment includes a method of improving blood circulation in a subject in need thereof. The method includes shining light towards the subject using a lighting device, separating the light into different wavelengths and/or polarizing the light into different orientations using a light filter, and shining the light of different wavelengths and/or orientations onto the subject. In one example embodiment, the lighting device includes a light source. A light is generated from the light source and shone towards the subject. In one embodiment, the light source can be a fluorescent light, a LED light, an incandescent light, a LASER light, a UV light, an infrared emission by heating, or an infrared LED light.

The effect of LED therapy on blood circulation improvement in subjects using a LED light source with the light filter as described above were evaluated by a blood microcirculation test using a blood microcirculation microscope (DMX980 DigiLens, 320× magnification). Subjects were placed under a LED light source with the light filter installed in the illumination direction of the LED light source such that the subjects will receive filtered LED therapy. Irradiation of filtered light on each subject was performed for a duration between 2 seconds to 20 seconds. The circulation of blood in the blood vessels of the subject's nailfold was inspected before and after irradiation by placing the subject's fingertip under the blood microcirculation microscope.

Figure 5:
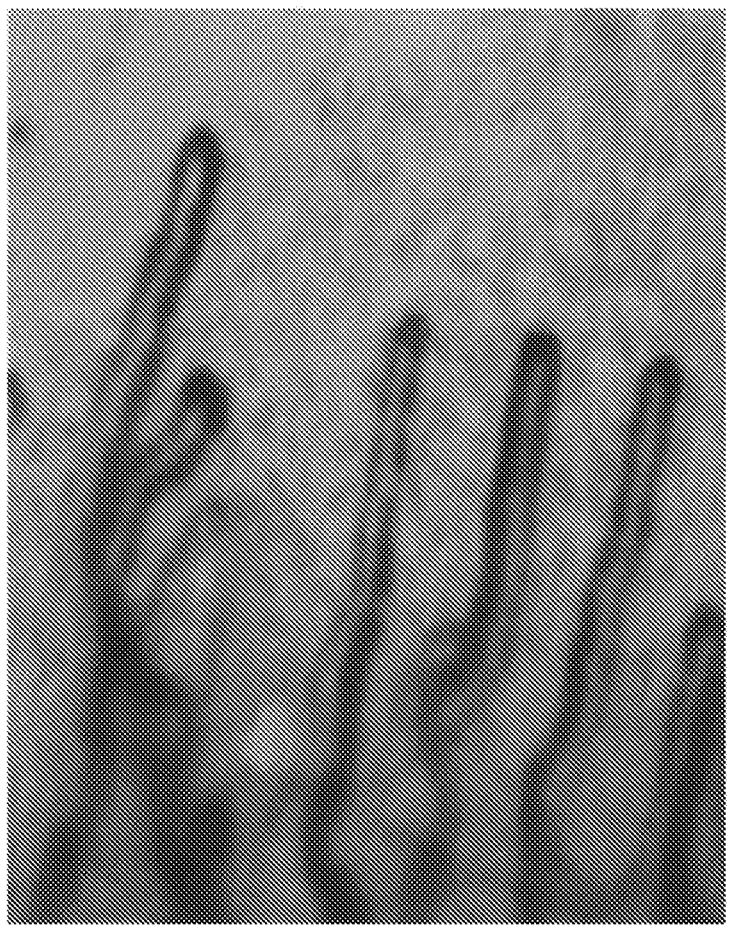
FIG. 5 shows an image of blood capillary of a subject's nailfold observed under a blood microcirculation microscope.

FIG. 5 shows an image of blood capillary of a subject's nailfold observed under the blood microcirculation microscope at a magnification of 320×. After irradiation of filtered light on the subject, a 2 to 3-fold increase in blood circulation in the blood capillary of the subject's nailfold was recorded.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

What is claimed is:

1. A lighting device for light therapy, comprising
   a) a light source adapted to illuminate in at least one direction; and
   b) at least one light filter disposed in the at least one illumination direction of the light source, wherein the light filter comprising
      two or more layers of binder matrix; and
      a multitude of transparent crystals randomly and irregularly dispersed in each layer of the binder matrix; wherein the multitude of transparent crystals have various shapes and sizes, and the particle size of each transparent crystal is between 0.01 mm and 5 mm; the transparent crystals are made of glass, crystals, or silicon dioxide; and the various shapes are irregular polygonal shapes;
   whereby light from the light source passing through the multitude of randomly and irregularly dispersed transparent crystals in the light filter is refracted and/or reflected to be polarized into different orientations.

2. The lighting device of claim 1, wherein the binder matrix is made of a transparent polymer.

3. The lighting device of claim 2, wherein the transparent polymer is selected from the group consisting of polycarbonate, PMMA, polyethylene terephthalate, PETG, PVC, liquid silicone rubber, cyclic olefin copolymers, polyethylene, polystyrene, MABS, ionomer resin, polypropylene, FEP, SMMA, SAN, epoxy or a combination thereof.

4. The lighting device of claim 1, wherein the light filter comprises three layers of binder matrix.

* * * * *